MAGNETIC AMPLIFIERS

Filed Sept. 2, 1953 3 Sheets-Sheet 1

WITNESSES:
John E. Healy
K. W. Thomas

INVENTOR
Franklin S. Malick.
BY Ezra W. Savage
ATTORNEY

WITNESSES:
John E. Healy
K. H. Thomas

INVENTOR
Franklin S. Malick.
BY Ezra W. Savage
ATTORNEY

United States Patent Office 2,773,235

Patented Dec. 4, 1956

2,773,235

MAGNETIC AMPLIFIERS

Franklin S. Malick, Milwaukee, Wis., assignor to Westinghouse Electric Corporation, East Pittsburgh, Pa., a corporation of Pennsylvania Application September 2, 1953, Serial No. 378,111

10 Claims. (Cl. 323—60)

This invention relates to amplifiers and more particularly to the combination of a saturable reactor and a power supply therefore.

The control characteristic of a saturable reactor with positive feedback, and more particularly a self-saturating magnetic amplifier, which receives sine-wave power from an alternating-current power system varies in accordance with the magnitude and frequency of the power system supply voltage. In other words, the cut-off point of the magnetic amplifier does not always occur at the same value of control ampere turns. However, in balanced push-pull magnetic amplifiers, for instance, it is highly desirable that the cut-off point does not change. Heretofore, a correction for this variation in the magnitude and frequency of the supply voltage was obtained by adjusting the magnitude of the bias voltage applied to the bias winding or windings of the magnetic amplifier. However, this requires accurate circuits for automatically adjusting the bias voltage in accordance with the changes in the magnitude and frequency of the power system supply voltage applied to the load windings of the magnetic amplifier.

It has also been known that by increasing the magnitude of the power system supply voltage to the load windings of a magnetic amplifier so that the core means of the magnetic amplifier saturates each half-cycle of the power system supply voltage, even when the current flow through the load windings is at a minimum, the discontinuity known as triggering is eliminated. However, if the magnitude and frequency of the power system supply voltage to the load windings of the magnetic amplifier varies two undesirable things take place. For instance, if the magnitude of the power system supply voltage decreases or the frequency of the power system supply voltage increases sufficiently, triggering may be permitted. Also, if the magnitude of the supply voltage increases or the frequency of the supply voltage decreases, excessive minimum current flow through the load windings is produced.

An object of this invention is to provide for supplying substantially constant volt-seconds per cycle to the load windings of a magnetic amplifier irrespective of variations in the magnitude or frequency of its power system supply voltage, by controlling the supply voltage so that the average voltage supplied to the load windings of the magnetic amplifier is proportional to the frequency of the power system supply voltage.

Another object of this invention is to render a magnetic amplifier substantially insensitive to changes in the magnitude of its power system supply voltage.

A further object of this invention is to provide for substantially eliminating the discontinuity known as triggering in a magnetic amplifier, by supplying a substantially constant value of volt-seconds to the load windings of the magnetic amplifier each half-cycle of the power system supply voltage so that a constant value of direct-current control ampere turns will cause the magnetic amplifier to be cut-off.

A still further object of this invention is to provide for substantially eliminating the discontinuity known as triggering in a magnetic amplifier, by causing the magnetic amplifier core means to saturate each half-cycle of the power system voltage by supplying a substantially constant value of volt-seconds to the load windings of the magnetic amplifier each half-cycle of the power system voltage regardless of the magnitude or frequency of its power system voltage.

Other objects of this invention will become apparent from the following description when taken in conjunction with the accompanying drawings in which.

Figures 1, 2, 3:
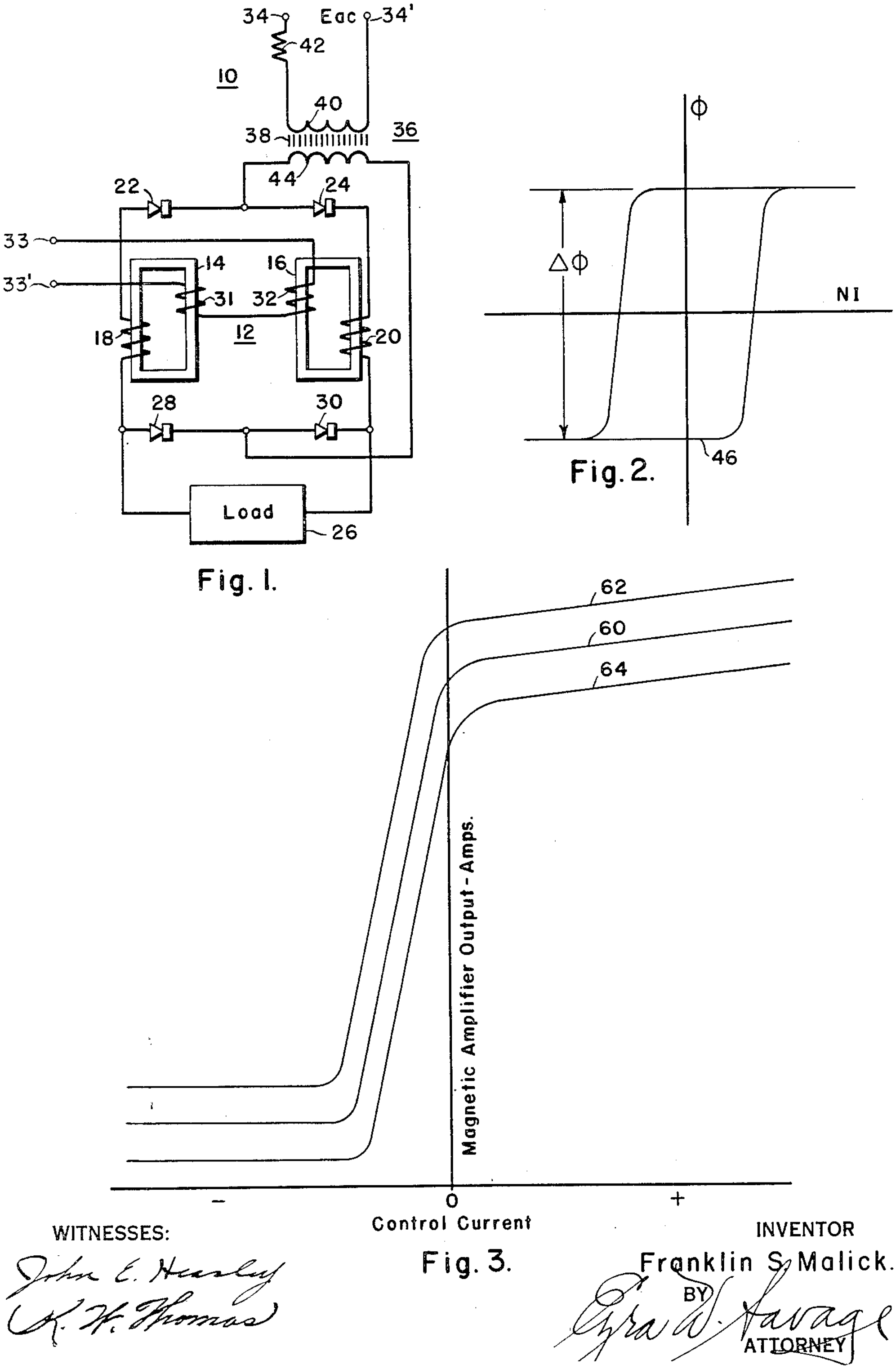
Figure 1 is a schematic diagram of circuits and apparatus illustrating the teachings of this invention.
Fig. 2 is a graph illustrating the hysteresis loop of the saturating transformer incorporated in the apparatus illustrated in Fig. 1.
Fig. 3 is a graph illustrating the transfer curves of the self-saturating magnetic amplifier incorporated in the apparatus of Fig. 1.

Referring to Fig. 1, there is illustrated a saturating transformer power supply 10 for supplying energy to a magnetic amplifier 12 of the self-saturating type. As illustrated, the magnetic amplifier 12 is of a standard type, it being understood that this invention can also be practiced by the substitution of another type of magnetic amplifier, such as a magnetic amplifier having substantially 100 percent positive feedback, for the magnetic amplifier 12.

In particular, the magnetic amplifier 12 comprises two magnetic core members 14 and 16. Load windings 18 and 20 are disposed in inductive relationship with the core members 14 and 16, respectively. Self-saturation of the core members 14 and 16, respectively, is obtained by connecting a self-saturating rectifier 22 in series circuit relationship with the load winding 18 and by connecting a self-saturating rectifier 24 in series circuit relationship with the load winding 20. In order that direct current is supplied to a load 26, load rectifiers 28 and 30 are provided. In particular, the load rectifiers 28 and 30 are connected in series circuit relationship with one another, the series circuit being connected across the load 26. One end of this series circuit is also connected to one end of the load winding 18, the other end of the series circuit being connected to one end of the load winding 20.

In order to control the magnitude of the current flow through the load windings 18 and 20, respectively, control windings 31 and 32 are disposed in inductive relationship with the core members 14 and 16, respectively. In this instance, the control windings 31 and 32 are connected in series circuit relationship with one another, the series circuit being connected to terminals 33 and 33' which have applied thereto a variable direct-current voltage.

In accordance with the teachings of this invention, the saturating transformer power supply 10 is provided in order to supply a substantially constant value of volt-seconds to the load windings 18 and 20 of the magnetic amplifier 12 each half-cycle of the power system supply voltage regardless of the magnitude or frequency of the power system voltage as applied to the terminals 34 and 34'. Also, as will be explained more fully hereinafter, by providing the saturating transformer power supply 10 and by so interconnecting it with the magnetic amplifier 12, triggering of the magnetic amplifier 12 is prevented.

As illustrated, the saturating transformer power supply 10 comprises a saturating transformer 36 having a magnetic core member 38, preferably constructed of rectangular loop core material, as will be explained hereinafter. The primary circuit for the saturating transformer power supply 10 comprises a primary winding 40 disposed in inductive relationship with the core member 38 and a current limiting impedance or resistor 42 connected in series circuit relationship with the primary winding 40 in order to limit the flow of current through the primary winding 40 once the alternating-current power system voltage applied to the terminals 34 and 34′ effects a substantially complete magnetic saturation of the magnetic core member 38 of the saturating transformer 36. As illustrated, the series circuit including the primary winding 40 and the current limiting resistor 42 is connected to the terminals 34 and 34′. In practice, the impedance of the current limiting resistor 42 should be small compared to the impedance of the magnetic amplifier load 26 and also small as compared to the unsaturated impedance of the primary winding 40 of the saturating transformer 36. However, the impedance of the current limiting resistor 42 should be large compared to the saturated impedance of the primary winding 40 of the saturating transformer 36. Also, in practice, the magnitude and the frequency of the alternating-current power system voltage applied to the terminals 34 and 34′ must be such as to effect a substantially complete magnetic saturation of the core member 38 of the saturating transformer 36 during each half-cycle of the alternating-current power system voltage applied to the terminals 34 and 34′.

The average output voltage from the saturating transformer 36 and thus from the saturating transformer power supply 10 appears across the secondary winding 44 which is disposed in inductive relationship with the core member 38 of the saturating transformer 36. In order to apply the average voltage appearing across the secondary winding 44 of the saturating transformer 36 to the load windings 18 and 20 of the magnetic amplifier 12, and thus alternately effect a current flow through the load windings 18 and 20, one end of the secondary winding 44 of the saturating transformer 36 is connected to the junction point of the load rectifiers 28 and 30, and the other end of the secondary winding 44 is connected to the junction point of the self-saturating rectifiers 22 and 24. In particular, the energizing circuit for the load winding 18 of the magnetic amplifier 12 when the right end of the secondary winding 44 of the saturating transformer 36, as illustrated, is at a positive potential with respect to the left end of the secondary winding 44, extends from the right end of the secondary winding 44 through the load rectifier 30, the load 26, the load winding 18, and the self-saturating rectifier 22 to the left end of the secondary winding 44. On the other hand, the energizing circuit for the load winding 20 of the magnetic amplifier 12 when the left end of the secondary winding 44, as illustrated, is at a positive potential with respect to the right end of the secondary winding 44, extends from the left end of the secondary winding 44 of the saturating transformer 36 through the self-saturating rectifier 24, the load winding 20, the load 26, and the load rectifier 28, to the right end of the secondary winding 44.

Figure 4:
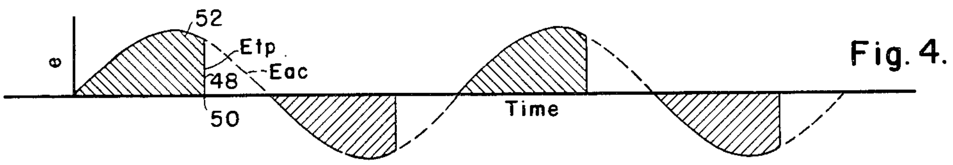
Figs. 4 through 9 are graphs which facilitate an understanding of the apparatus embodying the teachings of this invention.

The operation of the apparatus illustrated in Fig. 1 can be better understood by referring to Figs. 2 and 4. Suppose that the core member 38 of the saturating transformer 36 is in the condition represented at point 46 of Fig. 2. When the alternating-current voltage is applied to the terminals 34 and 34′, the flux in the core member 38 increases as illustrated by the right hand side of the hysteresis loop, shown in Fig. 2, and the voltage $E_{tp}$, as shown in Fig. 4, appears across the primary winding 40 of the saturating transformer 36, and by transformer action a voltage $E_{ts}$ appears across the secondary winding 44. This voltage $E_{ts}$ is applied to the load windings 18 and 20 of the magnetic amplifier 12. It is to be noted that the slope of the line 48 in Fig. 4, and thus the accuracy with which the apparatus of this invention renders the magnetic amplifier 12 substantially insensitive to changes in the magnitude and frequency of the voltage applied to the terminals 34 and 34′, is determined in great part by the material from which the core member 38 of the saturating transformer 36 is constructed. In particular, if the core member 38 is constructed of substantially rectangular loop core material the line 48 is substantially vertical and the above mentioned accuracy is high.

The change of flux in the magnetic core member 38 of the saturating transformer 36 is related to the voltage wave $E_{ac}$ applied to the terminals 34 and 34′ as follows:

$$\int e\,dt = N\int d\phi$$

where N is the number of turns of the primary winding 40 of the saturating transformer 36 and $e$ is the magnitude of the voltage wave $E_{ac}$ at any given time. Since the magnitude and the frequency of the power system voltage applied to the terminals 34 and 34′ is such as to substantially completely saturate the core member 38 of the saturating transformer 36 during each half-cycle of the power system voltage applied to the terminals 34 and 34′, the flux change in the core member 38 of the saturating transformer 36 must be from saturation in one direction to saturation in the other direction. This is a constant value $\Delta\phi$, therefor $$\int e\,dt = N\Delta\phi = K$$

Thus, the voltage integral in volt-seconds applied to the load windings 18 and 20 of the magnetic amplifier 12 is always constant regardless of the magnitude or frequency of the alternating-current power system voltage applied to the terminals 34 and 34′, provided the core member 38 of the saturating transformer 36 saturates during each half-cycle of the power system voltage applied to the terminals 34 and 34′. Therefore, the magnetic amplifier system of Fig. 1 has a constant cut-off point for the control characteristic regardless of changes in the magnitude or frequency of the power system voltage applied to the terminals 34 and 34′.

Figure 5:
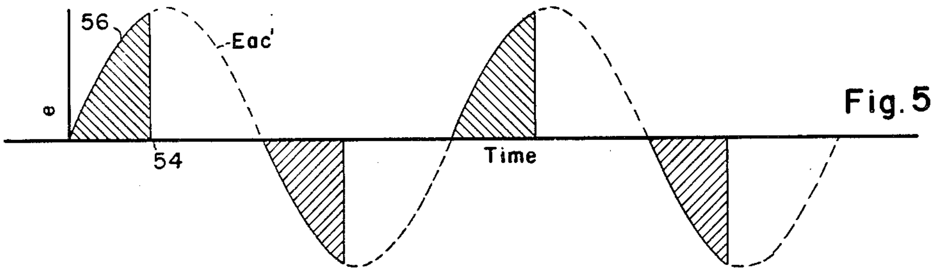

The fact that a constant value of volt-seconds is applied to the load windings 18 and 20 of the magnetic amplifier 12 during each half-cycle of the power system voltage applied to the terminals 34 and 34′ irrespective of changes in the magnitude of the voltage applied to the terminals 34 and 34′ can also be seen by referring to Figs. 4 and 5. For instance, as illustrated in Fig. 4, the core member 38 of the saturating transformer 36 saturates once the point 50 is reached. The hatched area 52 of the voltage wave $E_{ac}$ represents the number of volt-seconds required to substantially completely saturate the core member 38 of the saturating transformer 36.

In practice, it always takes the same number of volt-seconds to saturate the core member 38. Therefore, if the peak magnitude of the voltage wave $E_{ac}$, as shown in Fig. 4, is doubled as represented by the voltage wave $E'_{ac}$, as shown in Fig. 5, the core member 38 of the saturating transformer 36 will saturate at a point 54. As can be seen by referring to Figs. 4 and 5, the hatched portion 52 of the voltage wave $E_{ac}$ is substantially equal to the hatched portion 56 of the voltage wave $E'_{ac}$ as shown in Fig. 5. As can be seen from Figs. 4 and 5, the summation of the hatched portions, corresponding to the hatched portion 52, on the positive side of the voltage wave $E_{ac}$ over a given period of time will substantially equal the summation of the hatched portions of the voltage wave $E'_{ac}$ that corresponds to the hatched portion 56 and that appear on the positive side of the voltage wave $E'_{ac}$. Likewise, the hatched portions of the voltage wave $E_{ac}$ that appear on the negative side of the voltage wave $E_{ac}$ over a given period of time are substantially equal to the hatched portions of the voltage wave $E'_{ac}$ that appear on the negative side of the voltage wave $E'_{ac}$. Thus, the average alternating-current voltage appearing across the secondary winding 44 of the saturating transformer 36 as applied to the magnetic amplifier 12 is substantially constant even though the magnitude of the alternating-current power system voltage applied to the terminals 34 and 34′ varies.

By referring to Fig. 3, the effect of not providing the apparatus embodying the teachings of this invention is illustrated. For instance, a curve 60 is a transfer curve for a magnetic amplifier such as the magnetic amplifier 12 illustrated in Fig. 1. If the power system voltage applied to the terminals 34 and 34′ is applied directly to the magnetic amplifier 12 instead of to the saturating transformer 36 and assuming further that the magnitude of this voltage increases a predetermined amount, then the transfer curve 60 would shift to a new position such as represented by a curve 62. When this occurs, the output current from the magnetic amplifier 12 increases provided the control voltage applied to the terminals 33 and 33′ remains substantially constant. However, when the saturating transformer 36 is provided in accordance with the teachings of this invention, the transfer curve 60 does not change its position with an increase in the magnitude of the power system voltage applied to the terminals 34 and 34′ for the reasons as hereinbefore mentioned.

Again assuming that the power system voltage applied to the terminals 34 and 34′ is applied directly to the magnetic amplifier 12 instead of to the saturating transformer 36, and assuming further that the magnitude of the power system voltage applied to the terminals 34 and 34′ decreases, then the transfer curve 60 shifts to a new position as represented by a transfer curve 64. When such a shift in the transfer curve 60 occurs, the output current of the magnetic amplifier 12 decreases provided other conditions remain unchanged. However, when the saturating transformer 36 is provided in accordance with the teachings of this invention, such a decrease in the power system voltage applied to the terminals 34 and 34′, as hereinbefore mentioned, does not change the output current of the magnetic amplifier 12.

Figure 6:
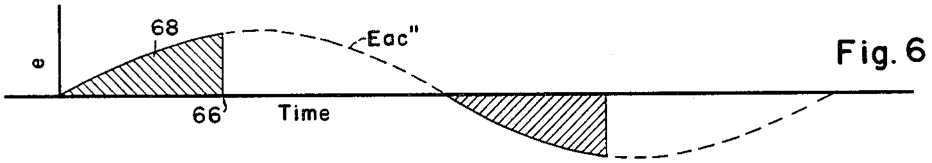

The effect of changing the frequency of the power system voltage applied to the terminals 34 and 34′ is illustrated by the voltage waves shown in Figs. 4 and 6. In particular, in accordance with the teachings of this invention, if the frequency of the power system voltage applied to the terminals 34 and 34′ is decreased to one-half the value of the frequency of the voltage wave $E_{ac}$ illustrated in Fig. 4, the core member 38 of the saturating transformer 36 will saturate at the point 66, as illustrated in Fig. 6. Since the core member 38 of the saturating transformer 36 substantially saturates once a given amount of volt-seconds is applied thereto, the hatched portion 68 of the voltage wave $E''_{ac}$ is substantially equal to the hatched portion 52 illustrated in Fig. 4. But, over a given period of time, the hatched portions of the voltage wave $E''_{ac}$ corresponding to the hatched portion 68 only cover approximately half of the area covered by the hatched portions corresponding to the hatched portion 52 illustrated in Fig. 4. Thus when the frequency of the voltage applied to the terminals 34 and 34′ is decreased to one-half its original value the magnitude of the average voltage applied to the load windings 18 and 20 is likewise decreased to approximately one-half its original value and thus the average voltage applied to the load windings 18 and 20 of the magnetic amplifier 12 is proportional to the frequency of the power system voltage applied to the terminals 34 and 34′.

Figure 8:
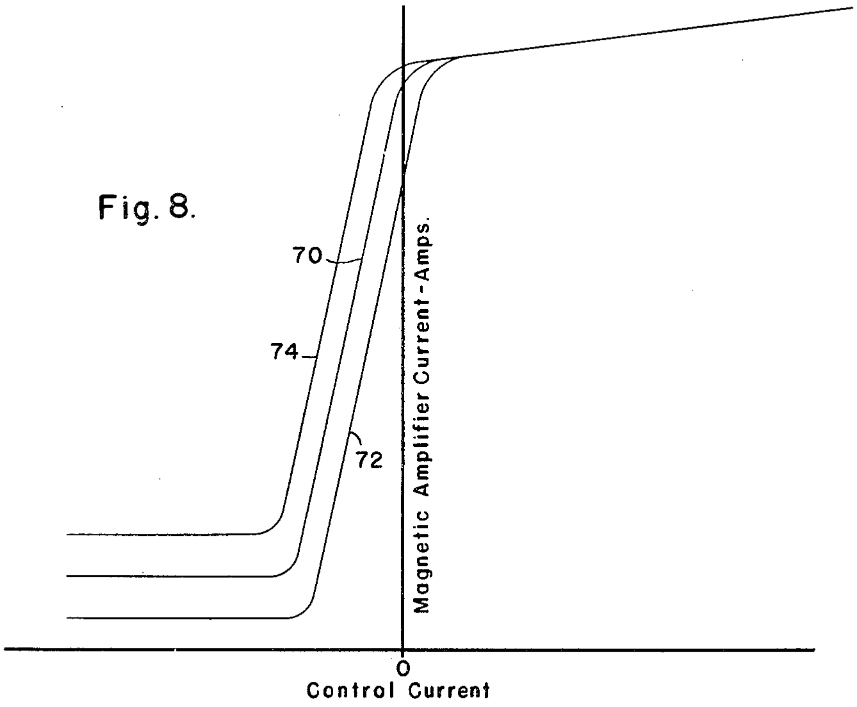

The effect of varying the frequency of the power system supply voltage applies directly to the load windings of a magnetic amplifier (not shown) such as the amplifier 12, without providing a saturating transformer power supply 10, can be seen by referring to Fig. 8. For instance, curves 70, 72 and 74 represent the transfer curves for the magnetic amplifier (not shown) for various frequencies of its power system supply voltage as applied to the load windings of the magnetic amplifier (not shown). If curve 70 is treated as the curve representing the normal frequency of the power system supply voltage, curve 72 is the transfer curve for a higher frequency of the power system supply voltage and curve 74 is the transfer curve for a lower frequency of the power system supply voltage. However, as can be seen from Fig. 8 the cut-off point for the magnetic amplifier (not shown) varies depending on the frequency of the power system supply voltage. Thus when utilizing the magnetic amplifier (not shown) a constant value of direct-current control ampere turns will not cause the magnetic amplifier (not shown) to be cut off.

Figure 9:
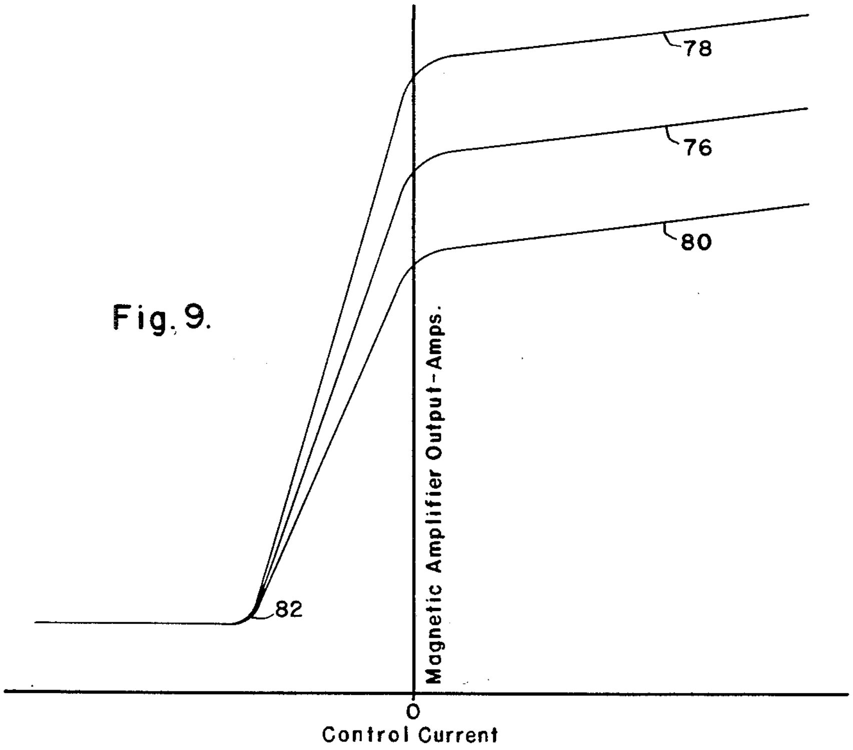

On the other hand when utilizing the apparatus illustrated in Fig. 1 a constant value of direct-current control ampere turns will cause the magnetic amplifier 12 to be cut off since the cut-off point for the magnetic amplifier 12 remains unchanged even though the frequency of the power system voltage applied to the terminals 34 and 34′ varies. This can be seen from Fig. 9 which illustrates the transfer curves for the magnetic amplifier 12 when incorporated in the apparatus illustrated in Fig. 1 and for various frequencies of the voltage applied to the terminals 34 and 34′. For instance a curve 76 represents the transfer curve for the normal frequency of the voltage applied to the terminals 34 and 34′ and curve 78 is the transfer curve for the magnetic amplifier 12 for a higher frequency of the voltage applied to the terminals 34 and 34′, while curve 80 is the transfer curve for a lower frequency of the voltage applied to the terminals 34 and 34′. However, it is to be noted that the cut-off point 82 for the amplifier 12 is the same for all three frequencies represented by the curves 76, 78 and 80. Thus, a constant value of direct-current ampere turns will cause the magnetic amplifier 12 to be cut off regardless of the magnitude or frequency of the power system voltage applied to the terminals 34 and 34′. Therefore, triggering of the magnetic amplifier 12 is prevented.

Figure 7:
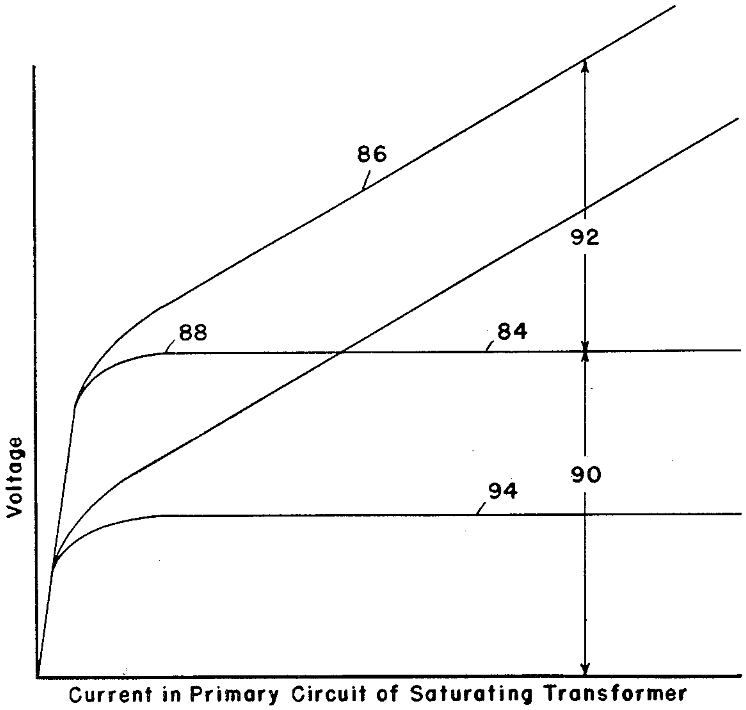

This invention can be further understood by reference to Fig. 7 which illustrates the manner in which the average voltage appearing across the primary circuit of the saturating transformer power supply 10 is distributed. For instance, a curve 84 represents the saturation curve for the saturating transformer 36 when the voltage applied to the terminals 34 and 34′ is at a given frequency. On the other hand, a curve 86 represents the voltage across the primary circuit of the saturating transformer power supply 10 for various values of current flow through this primary circuit for the given frequency. From the saturation curve 84, it can be seen that the average voltage appearing across the primary winding 40 of the saturating transformer 36 remains substantially constant once the substantially complete saturation point 88 of the core member 38 is reached, even though the voltage applied to the terminals 34 and 34′ is increased in magnitude. Thus, if the average voltage applied to the terminals 34 and 34′ is increased in magnitude beyond a certain magnitude, all of the increased portion of this voltage appears across the current limiting resistor 42. For instance, at a given value of average current flow through the primary circuit of the power supply 10, the voltage appearing across the primary winding 40 of the saturating transformer 36 is represented at 90 and the voltage appearing across the current limiting resistor 42 is represented at 92.

On the other hand, if the frequency of the voltage applied to the terminals 34 and 34′ is decreased to one-half its value as represented by the saturation curve 94, the curve 84 shifts to a position as represented by a saturation curve 94. As can be seen from Fig. 7, the decreasing of the frequency of the voltage applied to the terminals 34 and 34′ to a value of one-half its original value decreases the average voltage applied to the primary winding 40 of the saturating transformer 36 to approximately one-half its original value. Thus, as was explained hereinbefore, the average voltage applied to the load windings 18 and 20 of the magnetic amplifier is proportional to the frequency of the power system voltage applied to the terminals 34 and 34′.

Since certain changes may be made in the above apparatus and circuits, and different embodiments of the invention may be made without departing from the scope thereof, it is intended that all matter contained in the above description and shown in the accompanying drawings shall be interpreted as illustrative and not in a limiting sense.

I claim as my invention:

1. In electrical apparatus disposed to supply energy to a load, the combination comprising, a saturating transformer including a magnetic core member, a secondary winding disposed in inductive relationship with the magnetic core member, and a primary winding disposed in inductive relationship with the magnetic core member for receiving alternating-current voltage from a suitable source, the magnitude and the frequency of said alternating-current voltage being such as to effect a substantially complete magnetic saturation of the magnetic core member during each half cycle of said alternating-current voltage, and a magnetic amplifier having substantially 100 percent feedback, the magnetic amplifier including magnetic core means, a control winding disposed in inductive relationship with the magnetic core means for receiving a control signal, and a load winding disposed in inductive relationship with the magnetic core means and interconnected between the secondary winding of the saturating transformer and the load, the magnitude of the current flow through the load being substantially independent of the magnitude of said alternating-current voltage applied to the primary winding of the saturating transformer.

2. In electrical apparatus disposed to receive energy from a source of alternating-current voltage and to supply energy to a load, the combination comprising, a saturating transformer power supply including a magnetic core member, a secondary winding disposed in inductive relationship with the magnetic core member, and a primary circuit connected to the source of alternating-current voltage, the primary circuit including a primary winding disposed in inductive relationship with the magnetic core member and an impedance member for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a magnetic amplifier having substantially 100 percent feedback, the magnetic amplifier including magnetic core means, a control winding disposed in inductive relationship with the magnetic core means for receiving a control signal, and a load winding disposed in inductive relationship with the magnetic core means and interconnected between the secondary winding of the saturating transformer and the load, the magnitude of the current flow through the load being substantially independent of the magnitude of said alternating-current voltage applied to the primary winding of the saturating transformer.

3. In electrical apparatus disposed to receive energy from a source of alternating-current voltage and to supply energy to a load, the combination comprising, a saturating transformer power supply including a magnetic core member, a secondary winding disposed in inductive relationship with the magnetic core member, and a series circuit connected to the source of alternating-current voltage, the series circuit including a primary winding disposed in inductive relationship with the magnetc core member and a resistor for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a magnetic amplifier having substantially 100 percent feedback, the magnetic amplifier including magnetic core means, a control winding disposed in inductive relationship with the magnetic core means for receiving a control signal, and a load winding disposed in inductive relationship with the magnetic core means and interconnected between the secondary winding of the saturating transformer and the load, the magnitude of the current flow through the load being substantially independent of the magnitude of said alternating-current voltage applied to the primary winding of the saturating transformer.

4. In electrical apparatus disposed to receive energy from a source of alternating-current voltage and to supply energy to a load, the combination comprising, a saturating transformer power supply including a magnetic core member constructed of substantially rectangular loop core material, a secondary winding disposed in inductive relationship with the magnetic core member, and a primary circuit connected to the source of alternating-current voltage, the primary circuit including a primary winding disposed in inductive relationship with the magnetic core member and an impedance member for limitng the flow of current through the primary winding once said alternating-current voltages effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a magnetic amplifier having substantially 100 percent feedback, the magnetic amplifier including magnetic core means, a control winding disposed in inductive relationship with the magnetic core means for receiving a control signal, and a load winding disposed in inductive relationship with the magnetic core means and interconnected between the secondary winding of the saturating transformer and the load, the magnitude of the current flow through the load being substantially independent of the magnitude of said alternating-current voltage applied to the primary winding of the saturating transformer.

5. In electrical apparatus disposed to receive energy from a source of alternating-current voltage and to supply energy to a load, the combination comprising, a saturating transformer power supply including a magnetic core member constructed of substantially rectangular loop core material, a secondary winding disposed in inductive relationship with the magnetic core member, and a series circuit connected to the source of alternating-current voltage, the series circuit including a primary winding disposed in inductive relationship with the magnetic core member and a resistor for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a magnetic amplifier having substantially 100 percent feedback, the magnetic amplifier including magnetic core means, a control winding disposed in inductive relationship with the magnetic core means for receiving a control signal, and a load winding disposed in inductive relationship with the magnetic core means and interconnected between the secondary winding of the saturating transformer and the load, the magnitude of the current flow through the load being substantially independent of the magnitude of said alternating-current voltage applied to the primary winding of the saturating transformer.

6. In electrical apparatus disposed to supply energy to a load, the combination comprising, a saturating transformer including a magnetic core member, a secondary winding disposed in inductive relationship with the magnetic core member, and a primary winding disposed in inductive relationship with the magnetic core member for receiving alternating-current voltage from a suitable source, the magnitude and the frequency of said alternating-current voltage being such as to effect a substantially complete magnetic saturation of the magnetic core member during each half-cycle of said alternating-current voltage, and a self-saturating magnetic amplifier including magnetic core means, a control winding disposed in inductive relationship with the magnetic core means for receiving a control signal, and a series circuit including a self-saturating rectifier and a load winding disposed in inductive relationship with the magnetic core means, the series circuit being interconnected between the secondary winding of the saturating transformer and the load, the magnitude of the current flow through the load being substantially independent of the magnitude of said alternating current voltage applied to the primary winding of the saturating transformer.

7. In electrical apparatus disposed to receive energy from a source of alternating-current and to supply energy to a load, the combination comprising, a saturating transformer power supply including a magnetic core member, a secondary winding disposed in inductive relationship with the magnetic core member, and a primary circuit connected to the source of alternating-current voltage, the primary circuit including a primary winding disposed in inductive relationship with a magnetic core member and an impedance member for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a self-saturating magnetic amplifier including magnetic core means, a control winding disposed in inductive relationship with the magnetic core means for receiving a control signal, and a series circuit including a self-saturating rectifier and a load winding disposed in inductive relationship with the magnetic core means, the series circuit being interconnected between the secondary winding of the saturating transformer power supply and the load, the magnitude of the current flow through the load being substantially independent of the magnitude of said alternating-current voltage.

8. In electrical apparatus disposed to receive energy from a source of alternating-current voltage and to supply energy to a load, the combination comprising, a saturating transformer power supply including a magnetic core member, a secondary winding disposed in inductive relationship with the magnetic core member, and a series circuit connected to the source of alternating-current voltage, the series circuit including a primary winding disposed in inductive relationship with the magnetic core member and a resistor for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a self-saturating magnetic amplifier including magnetic core means, a control winding disposed in inductive relationship with the magnetic core means for receiving a control signal, and another series circuit including a self-saturating rectifier and a load winding disposed in inductive relationship with the magnetic core means, said another series circuit being interconnected between the secondary winding of the saturating transformer power supply and the load, the magnitude of the current flow through the load being substantially independent of the magnitude of said alternating-current voltage.

9. In electrical apparatus disposed to receive energy from a source of alternating-current voltage and to supply energy to a load, the combination comprising, a saturating transformer power supply including a magnetic core member constructed of substantially rectangular loop core material, a secondary winding disposed in inductive relationship with the magnetic core member, and a primary circuit connected to the source of alternating-current voltage, the primary circuit including a primary winding disposed in inductive relationship with the magnetic core member and an impedance member for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a self-saturating magnetic amplifier including magnetic core means, a control winding disposed in inductive relationship with the magnetic core means for receiving a control signal, and a series circuit including a self-saturating rectifier and a load winding disposed in inductive relationship with the magnetic core means, the series circuit being interconnected between the secondary winding of the saturating transformer power supply and the load, the magnitude of the current flow through the load being substantially independent of the magnitude of said alternating-current voltage.

10. In electrical apparatus disposed to receive energy from a source of alternating-current voltage and to supply energy to a load, the combination comprising, a saturating transformer power supply including a magnetic core member constructed of substantially rectangular loop core material, a secondary winding disposed in inductive relationship with the magnetic core member, and a series circuit connected to the source of alternating-current voltage, the series circuit including a primary winding disposed in inductive relationship with the magnetic core member and a resistor for limiting the flow of current through the primary winding once said alternating-current voltage effects a substantially complete magnetic saturation of the magnetic core member, the magnitude and the frequency of said alternating-current voltage being such as to effect a substantially complete magnetic saturation of the magnetic core member during each half-cycle of said alternating-current voltage, and a self-saturating magnetic amplifier including magnetic core means, a control winding disposed in inductive relationship with the magnetic core means for receiving a control signal, and another series circuit including a self-saturating rectifier and a load winding disposed in inductive relationship with the magnetic core means, said another series circuit being interconnected between the secondary winding of the saturating transformer power supply and the load, the magnitude of the current flow through the load being substantially independent of the magnitude of said alternating-current voltage.

References Cited in the file of this patent

UNITED STATES PATENTS

| | | |
|---|---|---|
| 2,306,998 | Claesson | Dec. 29, 1942 |
| 2,461,046 | FitzGerald | Feb. 8, 1949 |
| 2,710,313 | Logan | June 7, 1955 |
| 2,722,654 | Sikorra | Nov. 1, 1955 |

FOREIGN PATENTS

| | | |
|---|---|---|
| 559,303 | Great Britain | Feb. 14, 1944 |